UNITED STATES PATENT OFFICE.

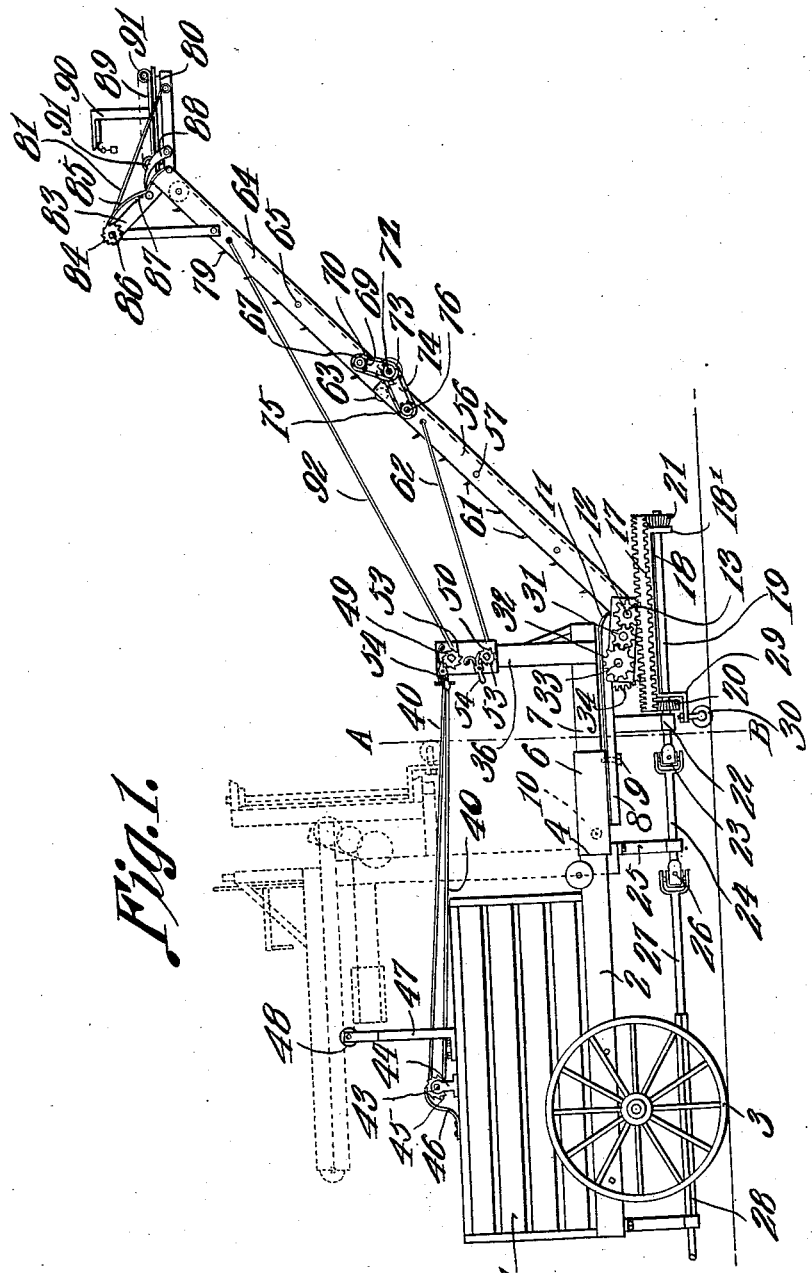

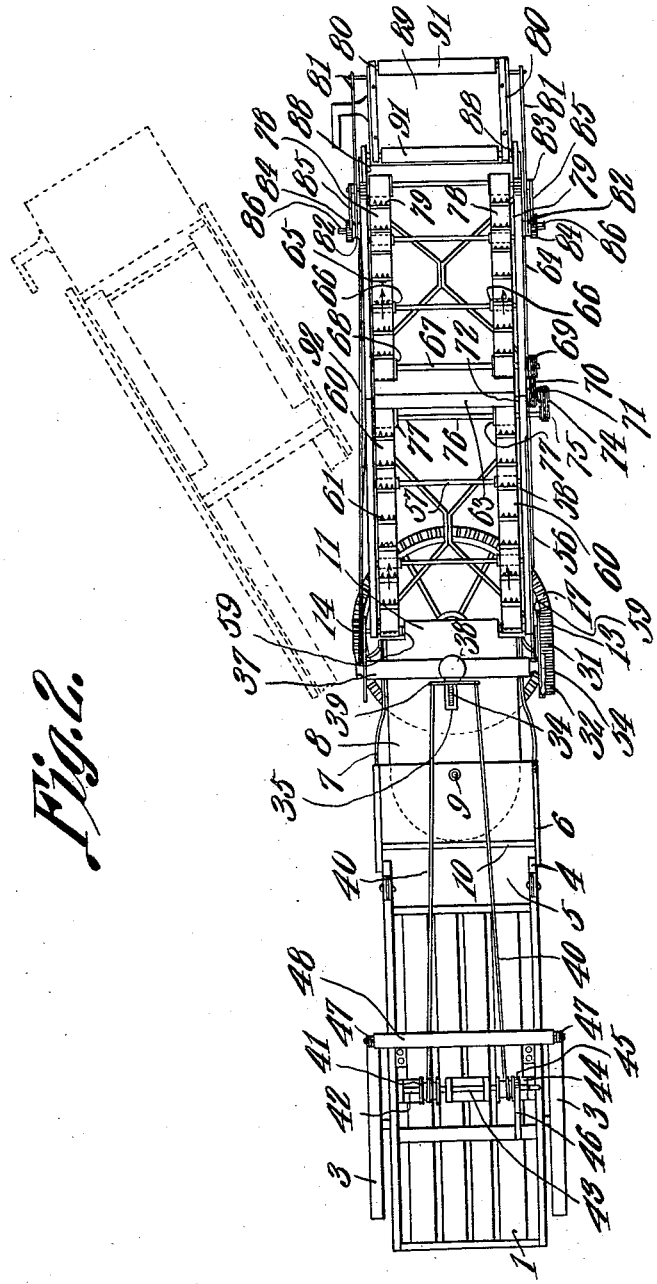

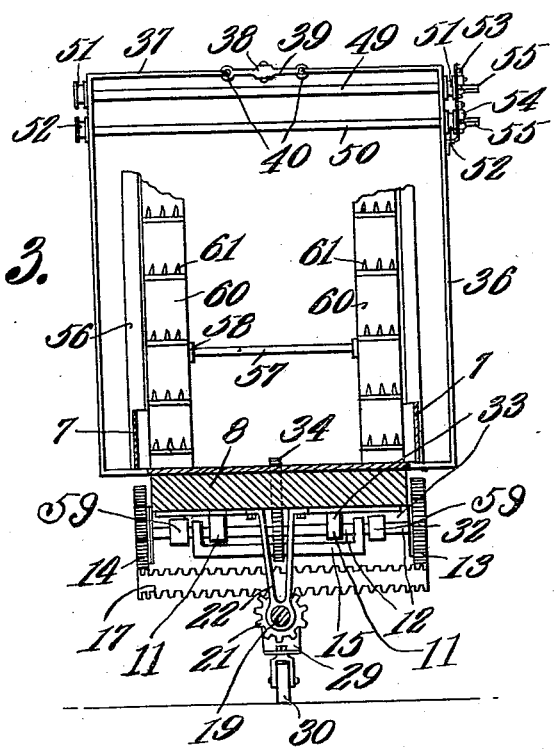
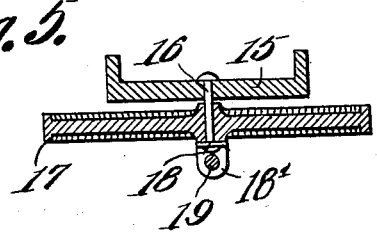
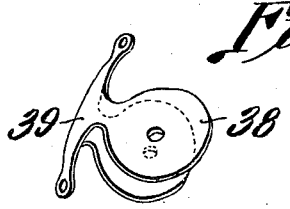

ARTHUR BRUNELLE, OF NORTH YAKIMA, WASHINGTON.

BALE-STACKER.

1,015,939.  Specification of Letters Patent.  Patented Jan. 30, 1912.

Application filed May 1, 1911. Serial No. 624,428.

*To all whom it may concern:*

Be it known that I, ARTHUR BRUNELLE, a citizen of the United States, residing at North Yakima, in the county of Yakima and State of Washington, have invented a new and useful Bale-Stacker, of which the following is a specification.

This invention relates to machines for stacking bales, the stacking mechanism being designed for use in connection with a baling machine so that, as the bales are discharged from the baling mechanism, they will be engaged and conveyed to a desired point from which they may be readily stacked.

Another object is to provide stacking mechanism which can be swung laterally relative to the baling mechanism, thus enabling the stack of bales to be extended over a considerable area without necessitating the shifting of the entire machine.

Another object is to provide stacking mechanism having means adjustably connected thereto whereby the bales can be successively weighed prior to being discharged from the mechanism.

A further object is to provide a stacking structure adjustable to different positions relative to the baling mechanism, there being means whereby said stacking mechanism can be folded onto the baling mechanism and thus occupy comparatively small space while the machine is being transported.

Another object is to provide a stacking machine the conveying members of which are so disposed as to successively engage the bales without tearing or otherwise injuring them.

With the foregoing and other objects in view which will appear as the description proceeds, the invention resides in the combination and arrangement of parts and in the details of construction hereinafter described and claimed it being understood that changes in the precise embodiment of the invention herein disclosed can be made within the scope of what is claimed without departing from the spirit of the invention.

In the accompanying drawings the preferred form of the invention has been shown.

In said drawings:—Figure 1 is a side elevation of the machine, the stacking mechanism being shown, by dotted lines, folded onto the baling mechanism. Fig. 2 is a plan view of the machine, one of the positions of the stacking mechanism, when swung laterally, being indicated by dotted lines. Fig. 3 is a section on line A—B Fig. 1, said figure being on an enlarged scale. Fig. 4 is a perspective view of the pivotal connection between the upstanding frame on the tiltable platform and the cables used for swinging the platform. Fig. 5 is a central vertical section through the double faced gear and its hanger.

Referring to the figures by characters of reference 1 designates, generally, baling mechanism of any suitable form, this mechanism being mounted on side beams 2 carried by supporting wheels 3. Side strips 4 are hingedly connected to the front ends of the side beams 2 and are connected by a platform section 5, the side strips having tubular extensions 6 fixed relative thereto and to the platform section and slidably engaged by flexible side strips 7 secured, at their front ends, to the side portions of a pivoted platform section 8. The section 8 extends under section 5 and is connected thereto by a pivot bolt 9, the flexible side strips 7 being designed, when section 8 is swung upon the bolt 9 and relative to section 5, to slide within the tubular extensions 6, said extensions and the flexible strips constantly constituting sides or guards for the platform irrespective of the relative positions of the two sections of the platform.

A guide roller 10 extends transversely of the platform section 5 and is journaled at its ends within the extensions 6, this roller being designed to support the bales as they are successively projected from the baling mechanism and to tilt and guide them onto the section 8 of the platform.

Bearing extensions 11 are arranged along the front end portion of the platform section 8 and have a shaft 12 journaled therein, there being a gear 13 keyed or otherwise secured to one end portion of the shaft while another gear 14 is loosely mounted on the other end of the shaft.

A hanger 15 extends downwardly from and is supported by the shaft 12 and has a bearing stud 16 extending downwardly from the middle portion thereof and on which a double-faced gear 17 is journaled. An arm 18 is also supported by the stud 16 below the gear 17 and has terminal ears 18' in which a shaft 19 is journaled, said shaft being provided with a gear 20 keyed or otherwise secured thereto and which engages the teeth on the lower face of the gear 17 while another gear 21 is loosely mounted on the shaft 19 and also engages said teeth, the gears 20 and 21 being arranged at diametrically opposed points on the gear 17. Shaft 19 is journaled within a bracket 22 fixedly connected to and depending from the platform section 8 and is connected, by a universal joint 23, to a short shaft section 24 journaled within a hanger 25 on platform section 5, this section 24 being also connected, as by a universal joint 26 to an angular shaft section 27. A tubular shaft section 28 is mounted to slide upon the section 27 and the interior of said section 28 is angular in transverse contour so as to be held against rotation independently of the section 27.

A hanger 29 extends downwardly from the arm 18 near one end thereof and a caster wheel 30 is connected to this hanger and serves to support the front portion of the platform and the mechanism carried thereby.

Gear 13 meshes with a gear 31 arranged at one side of the platform section 8 and this gear 31 in turn meshes with a gear 32 secured to one end of a shaft 33. Said shaft extends under and transversely of the platform section 8 and carries a toothed wheel 34 projecting upwardly through an opening 35 formed in the platform section 8 along the longitudinal center thereof.

A frame 36 is fixedly connected to and extends upwardly from the front portion of the platform section 8 and includes a cross strip 37 to the middle portion of which are pivotally connected disks 38 bearing upon the upper and lower faces respectively of said strip, these disks being connected by an elongated head 39. Cables 40 or the like are connected to the opposite end portions of said head and extend rearwardly to drums 41 secured to a shaft 43, this shaft being journaled within standards 44 mounted on the baling structure 1 and having a ratchet wheel 45 normally engaged by a pawl 46 whereby the shaft is held against rotation in one direction. Standards 47 are mounted on the baling structure at the sides thereof and near the standards 44 and support a roller 48 provided for the purpose hereinafter set forth.

Journaled within the frame 36 near the upper end thereof are upper and lower shafts 49 and 50 respectively, shaft 49 being formed with drums 51 adjacent the ends thereof while shaft 50 has drums 52 secured to it adjacent its ends. Each of these shafts has a ratchet wheel 53 normally engaged by a spring pressed pawl 54 whereby the shaft may be held against rotation in one direction. Each shaft has one end portion thereof projecting laterally from the frame and squared, as shown at 55.

Pivotally mounted on the shaft 12 close to the gears 13 and 14 are the side strips 56 of the lower section of the elevator frame of the stacker, these side strips being connected by cross rods 57 carrying rollers 58. Rollers 59 are fixedly connected to the shaft 12 close to the side strips 56 and serve to drive endless belts 60 carried by the rollers 58, each belt having a series of prongs 61 extending therefrom. Cables 62 or the like connect the upper portions of the side strips 56 to the drums 52. A guide roller 63 is journaled within the upper end portions of the side strips 56 and projects above the plane occupied by the upper runs of the belts 60, this roller being located beyond the outermost portions of the belts.

Hingedly connected to the upper end portions of the side strips 56, are side strips 64 of the frame of the upper section of the conveyer, these side strips being connected by cross rods 65 carrying rollers 66. A shaft 67 is journaled within the inner or lower end portions of the side strips 64 and carries rollers 68. Shaft 67 has a sprocket 69 upon one end thereof receiving motion through a chain 70 from a sprocket 71 secured to a shaft 72 which constitutes the pivotal connection between the side strips 56 and 64. Another sprocket 73 is secured to the shaft 72 and receives motion, through a chain 74, from a sprocket 75 secured to one end of a shaft 76 journaled in the upper or outer end portions of the side strips 56 and carrying the rollers 77 on which the upper portions of the belts 60 are mounted. It will thus be seen that when the lower belts 60 are actuated, motion will be transmitted therefrom through shaft 76, and the various chains and sprockets to the shaft 67 which thus serves to drive the belts 78 which are mounted on the rollers 68 and 66. These belts 78 carry teeth or prongs 79 similar to the prongs 61 and the upper runs of the belts 60 and 78 all travel in the same direction.

Although the parts 60 and 78 have been designated as belts, it is to be understood that these parts can be made up of ordinary sprocket chains and sprockets may be substituted for the various rollers mounted between the side strips of the conveyer sections.

A platform 80 is mounted between the upper or outer end portions of the side strips 64 and is adapted to swing relative thereto about an axis extending transversely of the conveyer. This platform has supporting cables 81 or the like connected to its outer corner portions and extending upwardly to drums 82 mounted on standards 83 projecting upwardly from the side strips 64. Each of these drums has a ratchet wheel 84 connected to it and adapted to be held against rotation in one direction by a spring pressed pawl 85 or the like. The shaft 86 of each drum is so shaped as to be readily engaged by a crank or similar operating device whereby the shaft and the drum thereon can be conveniently rotated for the purpose of winding the cable 81 thereon. Ratchet teeth 87 are preferably formed on the standards 83 and are adapted to be engaged by dogs 88 pivotally connected to the sides of the platform 80 and adapted to limit the upward swinging of the platform relative to the elevator when the cables 81 are wound upon the drums. The platform 89 of scales 90 is mounted on the platform 88 and guide rollers 91 are carried by the platform 89 and project thereabove, these rollers serving to direct the bales onto the scale platform 89 from the upper conveyer belts 78.

It will be apparent that when the various parts are set up for use, and as indicated in Figs. 1 and 2, the bales, as they are successively discharged from the baling apparatus will ride over the guide roller 10 and finally tilt downwardly into engagement with the toothed wheel 34. The shaft made up of sections 28, 27, 24 and 19, constitutes the power shaft and when it rotates, the gear 20 which is fixed thereon, rotates the gear 17, gear 21 revolving freely on the shaft section 19. As gear 17 revolves it rotates the gears 13 and 14 meshing therewith and as gear 13 is fixedly connected to shaft 12, it will be apparent that said shaft and the upper runs of belts 60 mounted thereon will be moved upwardly, motion being transmitted from shaft 76 to shaft 67 by means of the chains and sprockets described so as to drive the belts 78 in the direction indicated by arrows in Fig. 2. Gear 31 will at the same time transmit motion from gear 13 to gear 32 and shaft 33 and wheel 35 will therefore be rotated, the wheel 35 serving to force the bale along the platform section 8 until it comes into engagement with the teeth on the belts 60. Said belts will then draw the bale upwardly between the side strips 56 and onto the roller 63. This roller serves to keep the bale out of engagement with the teeth on the belts 78 until after the bale has assumed a position directly over the belts 78 whereupon it will tilt upon the roller 63 thus lifting out of engagement with the teeth 61 and moving downwardly into engagement with the teeth 79. Belts 78 will therefore convey the bale upwardly onto the roller 91 and force it along said roller to the platform 89 of the scales. The bale will here be weighed and the next bale forced onto the platform will serve to expel the preceding bale from the platform scales and deposit it onto the stack. When the stack reaches the height of the platform 80, the stacking mechanism can be swung laterally about the bolt 9 as a pivot, and as indicated by dotted lines in Fig. 2, this movement of the mechanism resulting in the shifting of the flexible side strips 7 within the tubular side strips 6. The operation of the mechanism will continue as before irrespective of this lateral swinging of the stacking mechanism.

When it is desired to fold the stacking mechanism, the cables 81 are wound upon the drums 82, it being understood that the dogs 91 must first be disengaged from the ratchet teeth 87. The platform 80 is thus brought into position perpendicular to the runs of the belts 78. The cables 92, which connect the upper portions of the side strips 64 to the drums 51, are then paid out so as to permit said side strips to swing downwardly relative to the side strips 56. Cables 62 are next wound on the drums 52, thus drawing the side strips 56 inwardly against the frame 36 and causing the side strips 64 to hang downwardly in contact with the side strips 56. The slack in the cables 92 is then taken up by winding said cables upon the drums 51. After the elevator has thus been folded, the cables 40 are wound on the drums 41 and the frame 36 is thus swung upwardly, carrying the platform sections 5 and 8 therewith, the side strips 4 being hingedly connected to the side strips 2 as hereinbefore stated so as to permit this swinging movement. The elevator frame made up of the strips 56 thus moves rearwardly and downwardly onto the roller 48, the universal joints in the power shaft permitting this swinging movement of the platform sections and the shaft section 27 sliding on the shaft section 28 to any extent necessary during the folding operation. With the parts thus compactly folded together the machine can be conveniently moved.

Although the elevator has been shown and described as made up of two hingedly connected sections, it is to be understood that, if preferred, only a single section may be employed in which event the belts will extend continuously from the lower to the upper or discharge end of the section and the chains and sprockets which have been described can then be eliminated. Obviously other mechanism than the chains and sprockets can then be employed for transmitting motion from one set of belts to the other set.

Any other arrangement of the sections of the power shaft may be employed in lieu of that disclosed, it merely being necessary to have the shaft so constructed as to bend and elongate whenever necessary during the swinging or the folding of the mechanism.

What is claimed is:—

1. The combination with baling apparatus, of a stacker including a foldable elevator mounted to swing laterally relative to the baling mechanism, means for directing bales from said baling mechanism to the elevator, means for folding the elevator, and means for swinging the folded elevator onto the top of the baling mechanism.

2. The combination with baling mechanism, of a stacker including a platform made up of pivotally connected sections, an elevator extending from the platform, and means upon the platform for guiding bales from the baling mechanism to the elevator.

3. The combination with baling mechanism, of a stacker including a platform for receiving bales from the said mechanism, an elevator adjustable relative to and supported by the platform, and revoluble means extending through the platform for directing bales from the baling mechanism to the elevator.

4. The combination with baling mechanism, of a stacker including a platform, an elevator adjustably connected to the platform, means extending through the platform for directing bales into engagement with the elevator, and means for successively tilting the bales into engagement with said directing means upon leaving the baling mechanism.

5. The combination with baling mechanism, of a stacker including a platform, an elevator, revoluble means extending above the platform for directing bales onto the elevator, and means in the path of the bales for successively tilting them from the baling mechanism and onto said revoluble means.

6. The combination with baling mechanism, of a stacker including a platform made up of pivotally connected sections, one of said sections being adapted to swing laterally relative to the other section, slidably engaged side members connected to said sections and constituting bale guides, an elevator extending from the platform, and means movably mounted upon one of the sections for shifting bales between said guides and onto the elevator.

7. The combination with baling mechanism, of a stacker including a platform hingedly connected to said mechanism, an elevator hingedly connected to the platform, and means for holding the platform against one end of the baling mechanism and for folding the elevator onto the top of the baling mechanism.

8. The combination with baling mechanism, of a stacker including a platform hingedly connected to said mechanism and foldable against one end thereof, an elevator hingedly connected to the platform and foldable onto the top of the baling mechanism, and separate means for folding the platform and the elevator.

9. The combination with baling mechanism, of a stacker including a sectional platform hingedly connected to and foldable against one end of the baling mechanism, one section of said platform being mounted to swing laterally relative to the other section and to the baling mechanism, an elevator hingedly connected to said section, and means for actuating the elevator irrespective of the angle of said section to the platform and of the elevator to said section.

10. The combination with baling mechanism, of a platform hingedly connected thereto and including pivotally connected sections, one of said sections being mounted to swing laterally relative to the other section, interengaging slidably connected side members carried by the sections and constituting bale guiding means, an elevator hingedly connected to the platform, winding mechanism for elevating the platform, and a pivotal connection between said mechanism and the platform.

11. A stacker including an elevator section, an endless conveyer mounted therein, means for actuating the conveyer, a scale platform at the discharge end of the conveyer and means for guiding bales successively onto the platform from the conveyer.

12. A stacker including a platform, an elevator section hingedly connected thereto, means for holding said section at a predetermined angle relative to the platform, and a scale platform adjustably supported at the discharge end of the section.

13. A stacker including a platform, an elevator section hingedly connected thereto, means for adjusting said section to a predetermined angle relative to the platform, a platform hingedly connected to the discharge end of the section, and a conveyer within said section for directing bales successively from the first mentioned platform to the platform at the discharge end of the section, and scales supported on said platform at the discharge end of the elevator.

14. A stacker including a platform, an elevator extending therefrom and adjustable relative thereto, said elevator including an endless conveyer, a platform hingedly connected to the outer end of the elevator, means for adjusting said platform to a predetermined angle relative to the conveyer, and scales carried by said adjustable platform.

15. A bale stacker including a sectional platform, one section of said platform being mounted to swing laterally relative to the other section, an elevator hingedly connected to said movable platform section, a platform carried by the elevator at the discharge end thereof, means for adjusting said last mentioned platform relative to the elevator, and scales carried by the adjustable platform, said scales including a bale receiving platform and revoluble means for guiding bales from the elevator and onto said platform.

In testimony that I claim the foregoing as my own, I have hereto affixed my signature in the presence of two witnesses.

ARTHUR BRUNELLE.

Witnesses:
 JNO. H. BRUFF,
 OSCAR R. SCHUNADEM.

Copies of this patent may be obtained for five cents each, by addressing the "Commissioner of Patents, Washington, D. C."